UNITED STATES PATENT OFFICE.

HENRY H. SNOW, OF NEW HAVEN, CONNECTICUT.

IMPROVEMENT IN PREPARATIONS OF COFFEE.

Specification forming part of Letters Patent No. 222,427, dated December 9, 1879; application filed March 31, 1879.

*To all whom it may concern:*

Be it known that I, HENRY H. SNOW, of New Haven, in the county of New Haven and State of Connecticut, have invented a new Improvement in Prepared Coffee; and I do hereby declare the following to be a full, clear, and exact description of the same.

This invention relates to an improvement in preparing roasted or ground coffee so as to preserve it from the deleterious effects of exposure to the atmosphere.

Coffee has been prepared with this object in view by combining with the ground coffee a glutinous substance, pressing into balls or cakes, to be broken when required for use.

The object of this invention is to preserve the coffee in its granular condition; and it consists in the preparation of the coffee, as hereinafter described, and particularly recited in the claim.

The coffee to be preserved is roasted and ground in the usual manner.

I take, by preference, pure crushed sugar, make it into a sirup, and cook until it is in the condition the same as for making rock-candy—that is to say, so that it will readily crystallize. The quantity of sugar should be one part, by weight, to two parts of coffee. Into the sirup thus prepared I introduce the coffee and stir it for about half a minute. The sugar crystallizes on the particles of coffee, completely enveloping them. Some of the finer particles will be gathered together; but generally the particles will be separate, each having its own covering.

The sugar-coating fully protects the coffee from the atmosphere, so that it may be preserved for an indefinite period without losing any of its properties. The sugar readily dissolves so soon as it is immersed in the water for preparing the coffee, and leaves the coffee free for the action of the water. The coffee thus prepared, being substantially in the same granular form as before being coated, is equally as convenient for use as if not coated, and much more convenient than that which is prepared in pressed cakes, because offering less trouble to obtain the requisite quantity of it.

I am aware that coffee has been coated with sugar and pressed into cakes; but in such preparation breaking the cakes exposes the coffee to the atmosphere and necessitates using the entire cake or losing the advantages of the preparation, whereas as prepared in this case it may be used in large or small quantities without imparing the preserving qualities of what remains.

I claim—

As an article of manufacture, granular coffee coated in its granular condition with sugar, and retaining substantially its granular condition—that is, the particles free or independent of each other.

HENRY H. SNOW.

Witnesses:
JOHN E. EARLE,
JOS. C. EARLE.